United States Patent
Koga

(10) Patent No.: US 10,601,893 B2
(45) Date of Patent: Mar. 24, 2020

(54) REMOTE OPERATION METHOD AND REMOTE OPERATION DEVICE

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 15/700,515

(22) Filed: Sep. 11, 2017

(65) Prior Publication Data
US 2018/0077218 A1 Mar. 15, 2018

(30) Foreign Application Priority Data

Sep. 13, 2016 (JP) .................................. 2016-178514

(51) Int. Cl.
| | | |
|---|---|---|
| *H04L 29/08* | (2006.01) | |
| *H04L 12/18* | (2006.01) | |
| *H04L 12/58* | (2006.01) | |
| *H04L 29/06* | (2006.01) | |
| *H04W 88/04* | (2009.01) | |
| *H04W 92/18* | (2009.01) | |

(52) U.S. Cl.
CPC .......... *H04L 67/025* (2013.01); *H04L 12/189* (2013.01); *H04L 12/1822* (2013.01); *H04L 51/046* (2013.01); *H04L 65/4076* (2013.01); *H04L 67/125* (2013.01); *H04W 88/04* (2013.01); *H04W 92/18* (2013.01)

(58) Field of Classification Search
CPC ... H04L 67/025; H04L 67/125; H04L 12/189; H04L 65/4076
See application file for complete search history.

(56) References Cited

U.S. PATENT DOCUMENTS

| | | | | |
|---|---|---|---|---|
| 2014/0237036 A1* | 8/2014 | Tanimoto | .............. | H04L 67/025 709/203 |
| 2015/0341441 A1* | 11/2015 | Saitoh | ..................... | H04L 67/38 709/208 |

FOREIGN PATENT DOCUMENTS

| | | |
|---|---|---|
| JP | 2006-139679 | 6/2006 |
| JP | 2008-103828 | 5/2008 |
| WO | 2013/047505 | 4/2013 |

* cited by examiner

*Primary Examiner* — Chris Parry
*Assistant Examiner* — Steven C Nguyen
(74) *Attorney, Agent, or Firm* — Xsensus LLP

(57) ABSTRACT

A remote operation method executed by a computer. The remote operation method includes, acquiring a first display information that is displayed on a first display of a terminal, displaying a second display information on a second display of the computer based on the first display information, the second display information including the first display information, determining whether a first remote operation of the terminal is under execution by another computer, the other computer displaying a third display information on a third display of the other computer, the third display information including the first display information, and performing a second remote operation of the terminal when it is determined that the first remote operation is not under execution by the other computer.

16 Claims, 15 Drawing Sheets

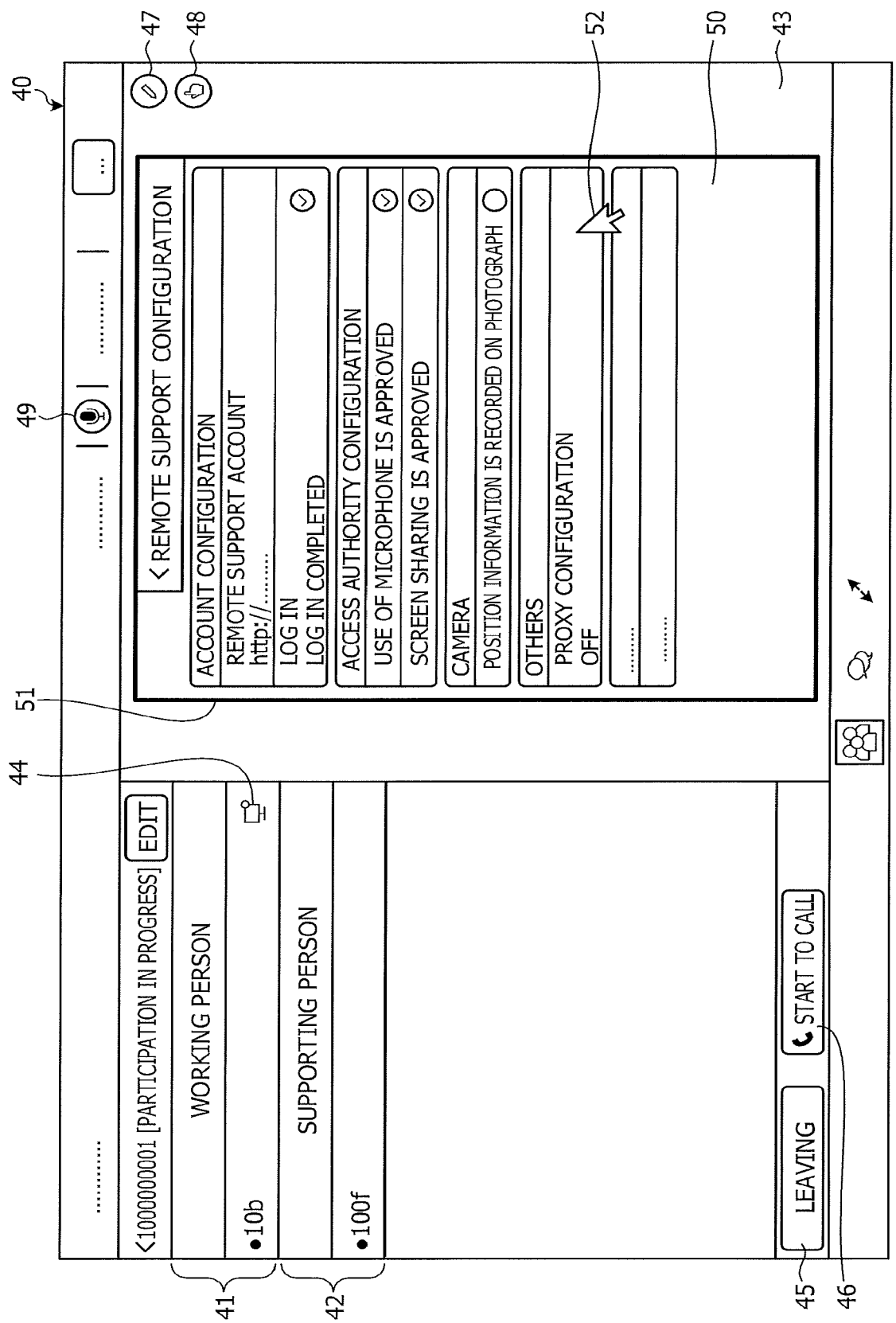

REMOTE OPERATION METHOD AND REMOTE OPERATION DEVICE

CROSS-REFERENCE TO RELATED APPLICATION

This application is based upon and claims the benefit of priority of the prior Japanese Patent Application No. 2016-178514, filed on Sep. 13, 2016, the entire contents of which are incorporated herein by reference.

FIELD

The embodiments discussed herein are related to technology of remote operation.

BACKGROUND

A supporting person-serving terminal and a supported person-serving terminal are connected to each other, a user of the supporting person-serving terminal performs remote support for a user of the supported person-serving terminal. With the remote support, a remote operation is performed in which the user of the supporting person-serving terminal operates a screen of the supported person-serving terminal. Furthermore, in recent years, it has been proposed that a plurality of supporting person-serving terminals perform the remote support for a plurality of supported person-serving terminals. In this case, there is a case where the plurality of supporting person-serving terminals make connections to one supported person-serving terminal for the remote support.

For example, the related art is disclosed in International Publication Pamphlet No. WO2013-047505, Japanese Laid-open Patent Publication Nos. 2006-139679 and 2008-103828, and others.

SUMMARY

According to an aspect of the invention, the remote operation method includes, acquiring a first display information that is displayed on a first display of a terminal, displaying a second display information on a second display of the computer based on the first display information, the second display information including the first display information, determining whether a first remote operation of the terminal is under execution by another computer, the other computer displaying a third display information on a third display of the other computer, the third display information including the first display information, and performing a second remote operation of the terminal when it is determined that the first remote operation is not under execution by the other computer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of the display screen on the supporting-person side in a state where the display screen on the supported-person side is shared;

DESCRIPTION OF EMBODIMENT

When a plurality of supporting person-serving terminals perform a remote operation on one supported person-serving terminal at the same time, there is a case where different functions are used at the same time, and there is a case where the operating of the supported person-serving terminal through the remote operation causes an erroneous operation. For this reason, redoing of the remote operation from the beginning takes place, and thus an operating burden on a user of the supporting person-serving terminal increases.

Embodiments of an operation control program, an operation control method, and an information processing device that are disclosed in the present application will be described in detail below with reference to the drawings. It is noted that according to the present embodiment, the disclosed technology is not limited. Furthermore, the following embodiments may be suitably combined in a range where the combination does not bring about contraction.

EMBODIMENT

Figure 1:
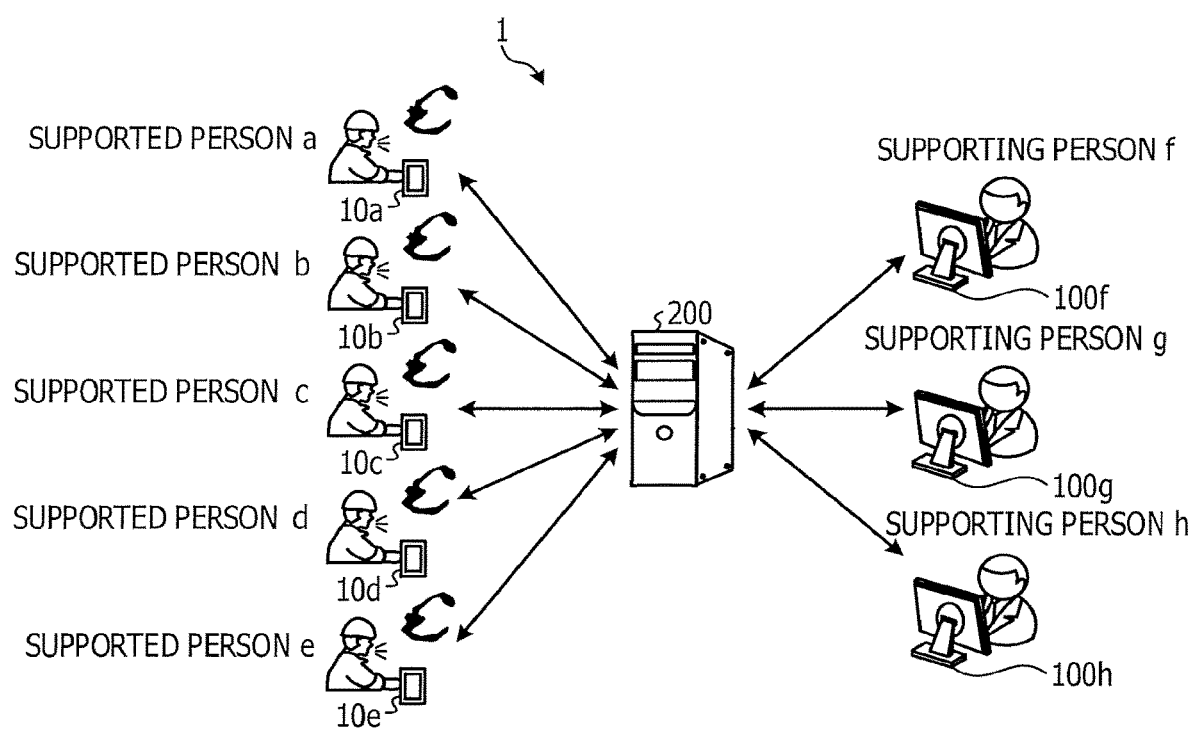
FIG. 1 is a diagram illustrating an example of a configuration of a remote support system according to an embodiment.

FIG. 1 is a diagram illustrating an example of a configuration of a remote support system according to the embodiment. A remote support system 1 that is illustrated in FIG. 1 is a remote support system in which the supporting person-serving terminals and the supported person-serving terminals are connected on a many-to-many basis, and has supported person-serving terminals 10a to 10e, supporting person-serving terminals 100f to 100h, and a server 200. The supported person-serving terminals 10a to 10e, the supporting person-serving terminals 100f to 100h, and the server 200 are connected to each other through a network that is not illustrated, in a manner that makes mutual communication possible.

It is noted that in the following description, when there is no distinction among the supported person-serving terminals 10a to 10e, there is a case where the supported person-serving terminals 10a to 10e are expressed as a supported person-serving terminal 10. Furthermore, when there is no distinction among the supporting person-serving terminals 100*f* to 100*h*, there is a case where the supporting person-serving terminals 100*f* to 100*h* are expressed as a supporting person-serving terminal 100.

The supported person-serving terminals 10*a* to 10, for example, are terminals that are used by operators at the workplace. The supported person-serving terminals 10*a* to 10*e* are information processing devices, each of which is operated by an operator in a state of being worn on the operator. For example, mobile communication terminals, such as tablet terminals and smartphones, can be used as the supported person-serving terminals 10*a* to 10*e*. Furthermore, a Head Mounted Display (HMD) may be made to be connected to each of the supported person-serving terminals 10*a* to 10*e*. It is noted that the supported person-serving terminals 10*a* to 10*e* are assumed to be used by supported persons a to e, respectively, who are operators. Furthermore, the supported person-serving terminals 10*a* to 10*e* are examples of specific information processing devices. More precisely, a specific supported person-serving terminal 10 is an example of a specific information processing device.

The supporting person-serving terminals 100*f* to 100*h*, for example, are terminals that are used by supporting persons who issue instructions to operators at the workplace or operate the supported person-serving terminals 10*a* to 10*e* remotely. As examples of the supporting person-serving terminals 100*f* to 100*h*, stationary-type personal computers can be employed. In addition to the stationary-type personal computers, for example, mobile communication terminals, such as portable personal computers, smartphones, and portable telephones, can be employed as the supporting person-serving terminals 100*f* to 100*h*. It is noted that the supporting person-serving terminals 100*f* to 100*h* are assumed to be used supporting persons f to h, respectively. Furthermore, a supporting person-serving terminal 100 is an example of the information processing device.

The supporting person-serving terminal 100 acquires image information of a display screen of a specific supported person-serving terminal 10 that performs processing in accordance with operation information that is received. Based on the acquired image information, the supporting person-serving terminal 100 displays a screen in accordance with the display screen on a display unit. The supporting person-serving terminal 100 makes a determination of whether or not a position of a cursor of the supporting person-serving terminal 100 is included within a range of the displayed screen, and makes a determination of whether or not information indicating that another supporting person-serving terminal 100 which has authority to operate a specific supported person-serving terminal 10 is present is stored in a storage unit. In a case where any determination is positive, the supporting person-serving terminal 100 transmits the operation information that includes the position of the cursor and details of the operation by the cursor, with a specific supported person-serving terminal 10 as a destination thereof. Accordingly, the supporting person-serving terminal 100 can reduce the operating burden on the supporting person during the remote operation.

The server 200 relays communication between each of the supported person-serving terminals 10*a* to 10*e* and each of the supporting person-serving terminals 100*f* to 100*h*. Based on a connection request from the supported person-serving terminal 10 or the supporting person-serving terminal 100, which is a connection request source, the server 200 relays communication between the supported person-serving terminal 10 or the supporting person-serving terminal 100, which is a connection request source, and the supporting person-serving terminal 100 or the supported person-serving terminal 10, which is a connection request destination. Furthermore, based on exclusive control starting information that is received from the supporting person-serving terminal 100, the server 200 notifies another supporting person-serving terminal 100 of exclusive starting. Additionally, based on exclusive control ending information that is received from the supporting person-serving terminal 100, the server 200 notifies another supporting person-serving terminal 100 of exclusive ending.

Figure 2:
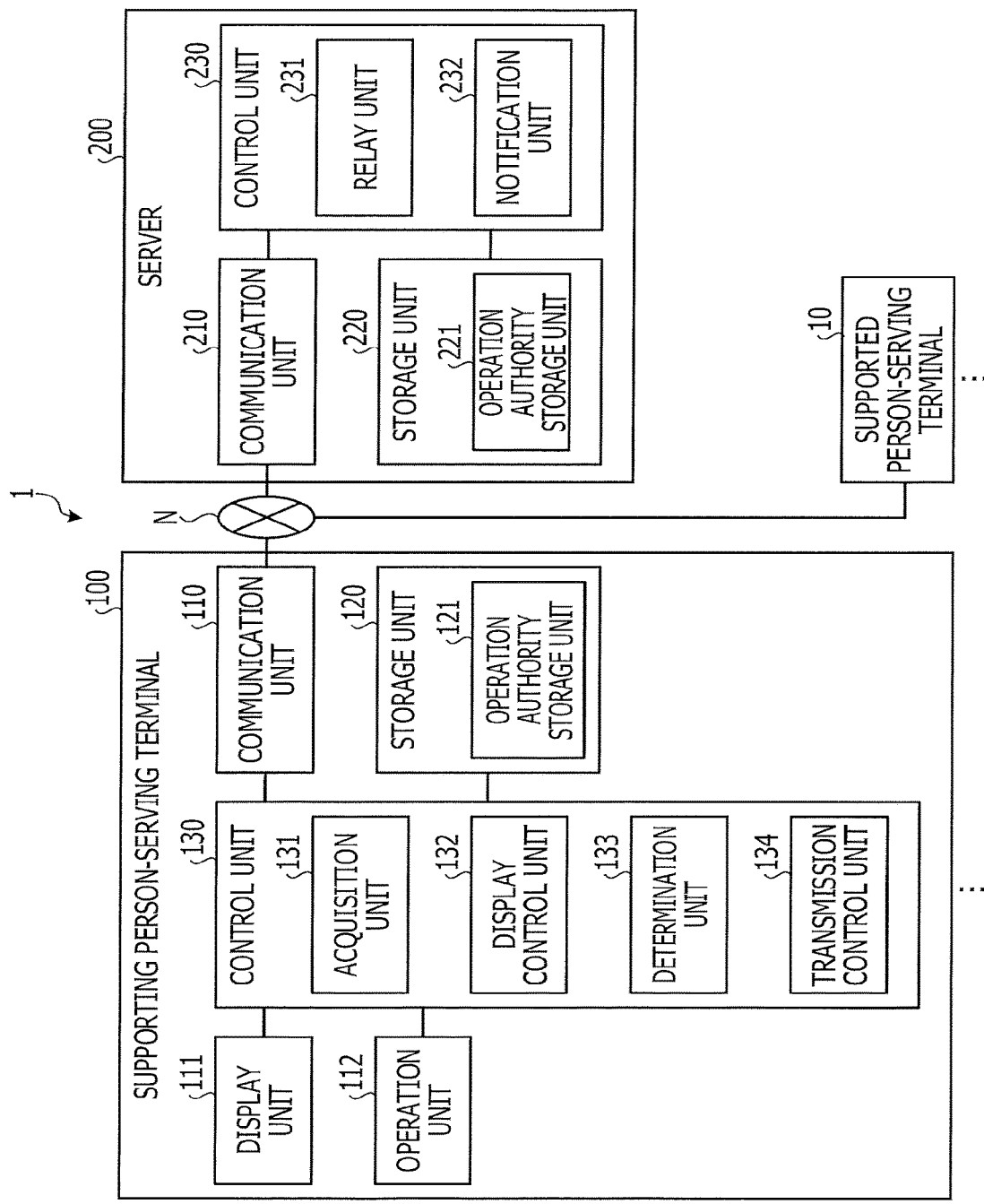
FIG. 2 is a block diagram illustrating an example of a configuration of the remote support system according to the embodiment.

Next, a configuration of the supporting person-serving terminal 100 is described with reference to FIG. 2. FIG. 2 is a block diagram illustrating an example of a configuration of the remote support system according to the embodiment. As illustrated in FIG. 2, the supporting person-serving terminal 100 has a communication unit 110, a display unit 111, an operation unit 112, a storage unit 120, and a control unit 130. It is noted that in addition to the functional units that are illustrated in FIG. 2, the supporting person-serving terminal 100 may have various functional units that are retained by a well-known computer, for example, functional units such as various input devices or audio output devices.

The communication unit 110, for example, is realized as a network interface card (NIC) or the like. The communication unit 110 is a communication interface that is connected to the supported person-serving terminal 10 and the server 200 in a wired or wireless manner through the network N, and manages communication of information between the supported person-serving terminal 10 and the server 200. The communication unit 110 makes a connection to the supported person-serving terminal 10 through the server 200, and establishes communication with the supported person-serving terminal 10. Furthermore, the communication unit 110 receives a starting event or ending event that is the exclusive control, from the server 200. The communication unit 110 outputs the received starting event or ending event that is the exclusive control, to the control unit 130. Furthermore, the communication unit 110 transmits the exclusive control starting information or exclusive control ending information that is input from the control unit 130, to the server 200. Additionally, the communication unit 110 transmits the operation information that is input from the control unit 130, to a specific supported person-serving terminal 10 through the server 200.

The display unit 111 is a display device for displaying various pieces of information. The display unit 111, for example, is realized as a liquid crystal display or the like, which serves as a display device. Various screens, such as display screen, that are input from the control unit 130, are displayed on the display unit 111.

The operation unit 112 is an input device to which various operations from the supporting person who is a user of the supporting person-serving terminal 100 are applied. The operation unit 112, for example, is realized as a keyboard, a mouse, or the like, which serves as an input device. The operation unit 112 outputs an operation that is input by the supporting person, as operation information, to the control unit 130. It is noted that the operation unit 112 may be realized as a touch panel or the like, which serves as an input device, and a display device of the display unit 111 and an input device of the operation unit 112 may be integrated into one piece.

The storage unit 120, for example, is realized as a semiconductor memory element, such as a random access memory (RAM) or a Flash Memory, or by a storage device, such as a hard disk or an optical disk. The storage unit 120 has an operation authority storage unit 121. Furthermore, information that is used for processing in the control unit 130 is stored in the storage unit 120.

Figure 3:
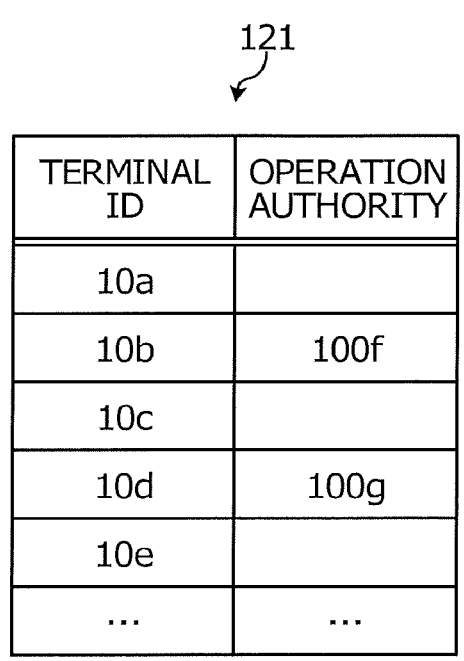
FIG. 3 is a diagram illustrating an example of an operation authority storage unit.

The authority to operate the supported person-serving terminal 10, which is in accordance with the starting event or ending event that is the exclusive control, which is received from the server 200, is stored in the operation authority storage unit 121. FIG. 3 is a diagram illustrating an example of the operation authority storage unit 121. As illustrated in FIG. 3, the operation authority storage unit 121 has items, a "terminal identifier (ID)" and "operation authority". For example, the terminal ID is stored as one record in the operation authority storage unit 121.

The "terminal ID" is an identifier that identifies the supported person-serving terminal 10. The "operation authority" is information indicating the supporting person-serving terminal 100 that has the authority to operate a corresponding supported person-serving terminal 10. In an example in the first line in FIG. 3, because an operation authority box for the supported person-serving terminal 10*a* that has a terminal ID "10*a*" is empty, a state where no supporting person-serving terminal 100 has the operation authority, that is, a state where the remote operation is not performed is illustrated. Furthermore, in an example in the second line in FIG. 3, a state where the supporting person-serving terminal 100*f* that has a terminal ID 100*f* has the authority to operate the supported person-serving terminal 10*b* that has a terminal ID "10*b*", that is, a state where the remote operation is performed is illustrated.

Returning to the description that is provided with reference to FIG. 2, for example, a central processing unit (CPU), a micro processing unit (MPU), or the like causes a program, which is stored within the storage device, to be executed to cause the RAM to operate as a working area, and thus the control unit 130 is realized. Furthermore, the control unit 130, for example, may be realized as an integrated circuit such as an application specific integrated circuit (ASIC) or a field programmable gate array (FPGA). The control unit 130 has an acquisition unit 131, a display control unit 132, a determination unit 133, and a transmission control unit 134, and realizes or performs a function or an operation for information processing that will be described below. It is noted that an internal configuration of the control unit 130 is not limited to the configuration that is illustrated in FIG. 2, and any configuration that performs the information processing that will be described below may be possible.

When a connection is established between a specific supported person-serving terminal 10 that is a support destination, and the supporting person-serving terminal 100, the acquisition unit 131 acquires the image information of the display screen of a specific supported person-serving terminal 10. When a change occurs on the display screen of a specific supported person-serving terminal 10, the acquisition unit 131 acquires image information that reflects the change and updates the image information of the display screen of the specific supported person-serving terminal 10. The acquisition unit 131 outputs the acquired image information to the display control unit 132.

Furthermore, when receiving the starting event or ending event that is the exclusive control, from the server 200 through a network N and the communication unit 110, the acquisition unit 131 configures the authority to operate a corresponding supported person-serving terminal 10 to be in the operation authority storage unit 121, based on the received starting event or ending event that is the exclusive control.

When the image information is input from the acquisition unit 131, the display control unit 132 generates a display screen for sharing a display screen of a specific supported person-serving terminal 10 based on the image information that is input. The display control unit 132 outputs the generated display screen to the display unit 111 for displaying. Furthermore, the display control unit 132 outputs information of the generated display screen to the determination unit 133.

Figure 4:
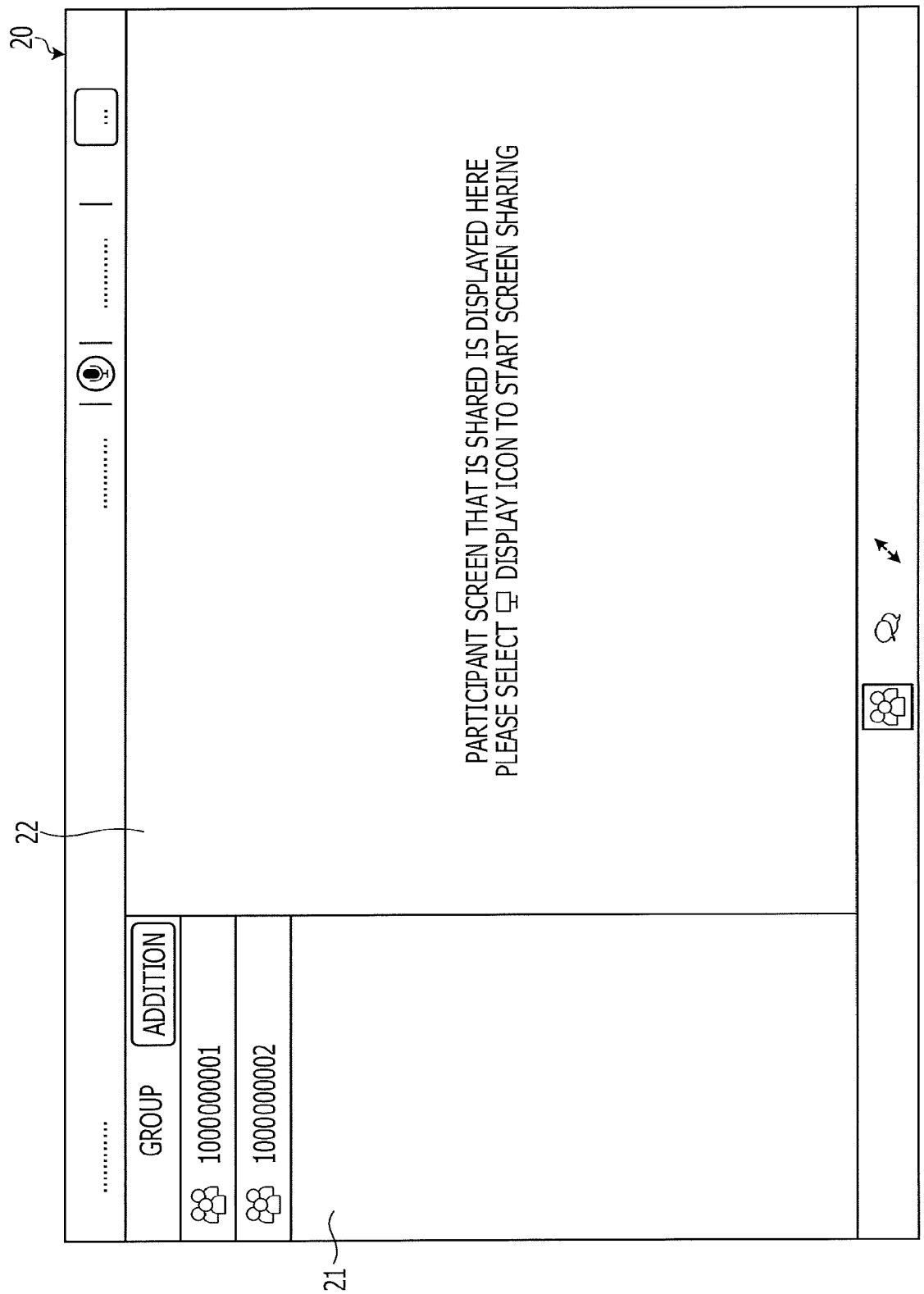
FIG. 4 is a diagram illustrating an example of a display screen on the supporting-person side.

At this point, various screens are described with reference to FIGS. 4 to 8. FIG. 4 is a diagram illustrating an example of the display screen on the supporting-person side. The display screen 20 that is illustrated in FIG. 4 is an example of an initial screen that is displayed on the supporting person-serving terminal 100. The display screen 20 has an area 21 where a terminal group including the supported person-serving terminal 10 and the supporting person-serving terminal 100 is selected, and an area 22 on which a display screen of a specific supported person-serving terminal 10 that is connected when the connection to the supported person-serving terminal 10 is made is displayed.

Figure 5:
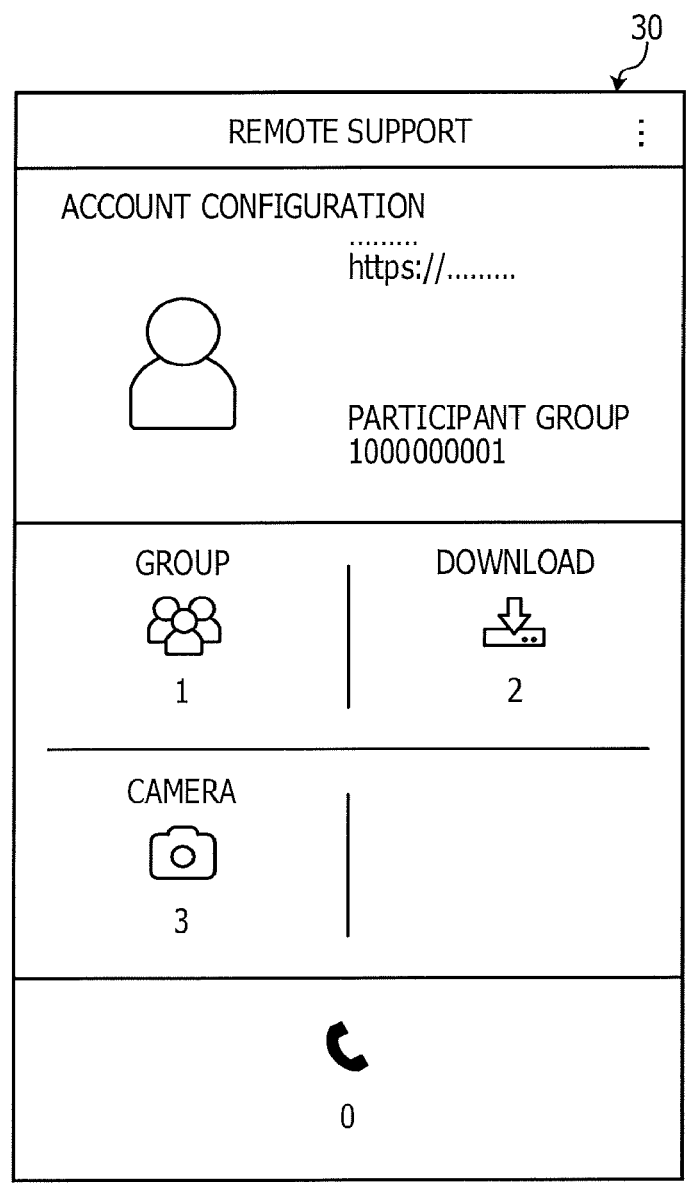
FIG. 5 is a diagram illustrating an example of a display screen on the supported-person side.

FIG. 5 is a diagram illustrating an example of a display screen on the supported-person side. A display screen 30 that is illustrated in FIG. 5 is an example of an initial screen that is displayed on the supported person-serving terminal 10. The display screen 30 is a screen on which an operation for performing the remote operation can be performed.

Figure 6:
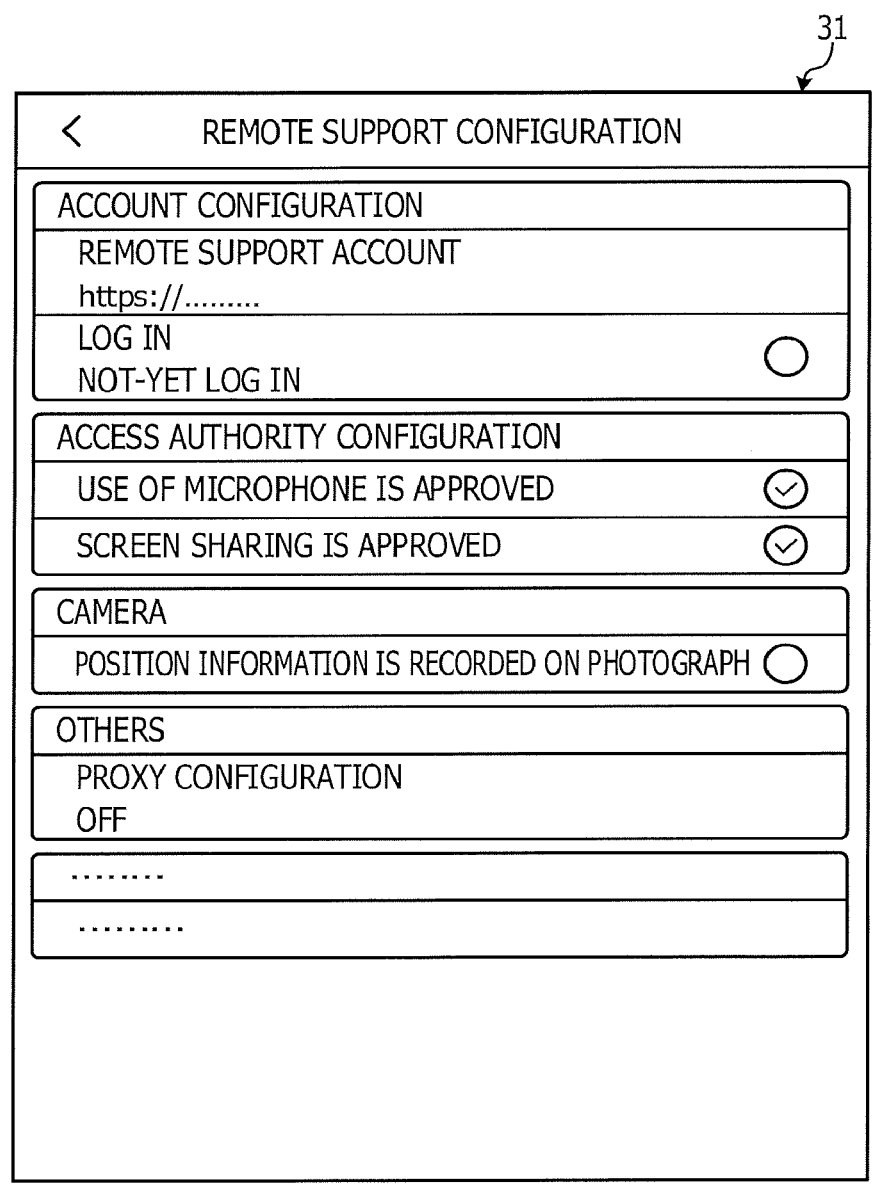
FIG. 6 is a diagram illustrating another example of the display screen on the supported-person side.

FIG. 6 is a diagram illustrating another example of the display screen on the supported-person side. A display screen 31 that is illustrated in FIG. 6 is an example of a configuration screen that is displayed on the supported person-serving terminal 10. The display screen 31 is a screen on which various configurations can be performed during the remote operation.

Figure 7:
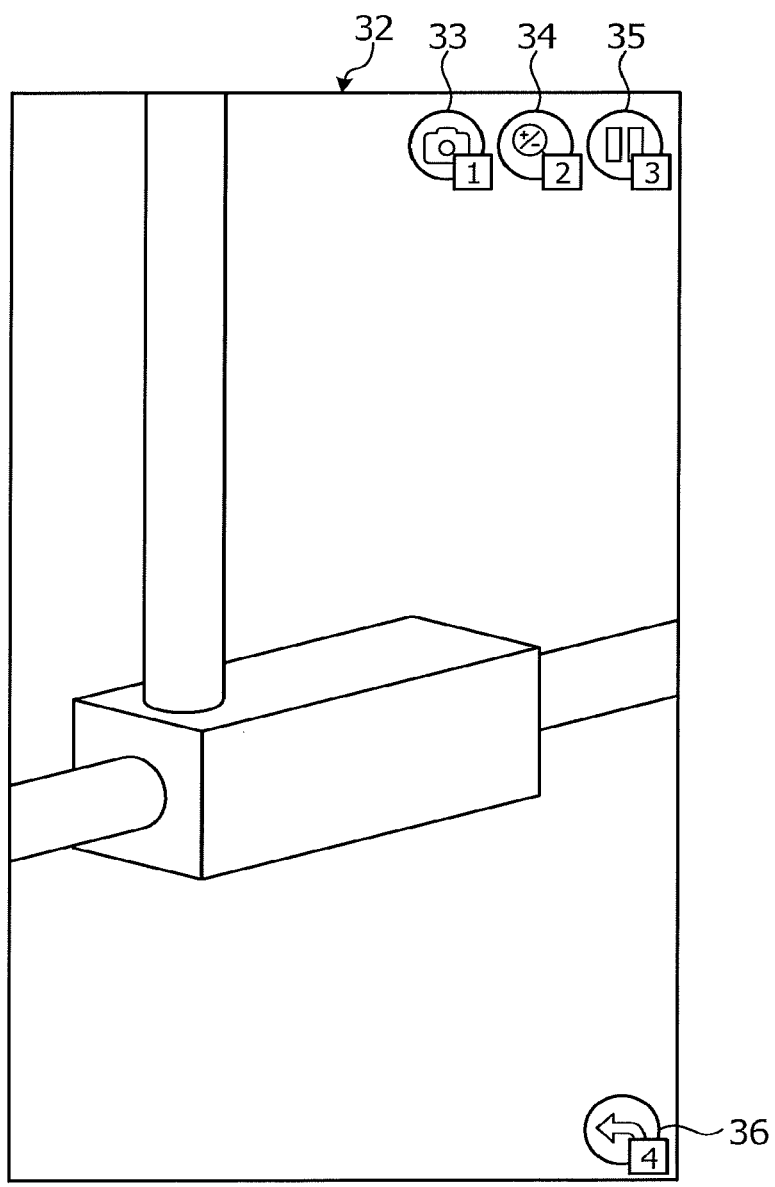
FIG. 7 is a diagram illustrating another example of the display screen on the supported-person side.
Figure 9A:
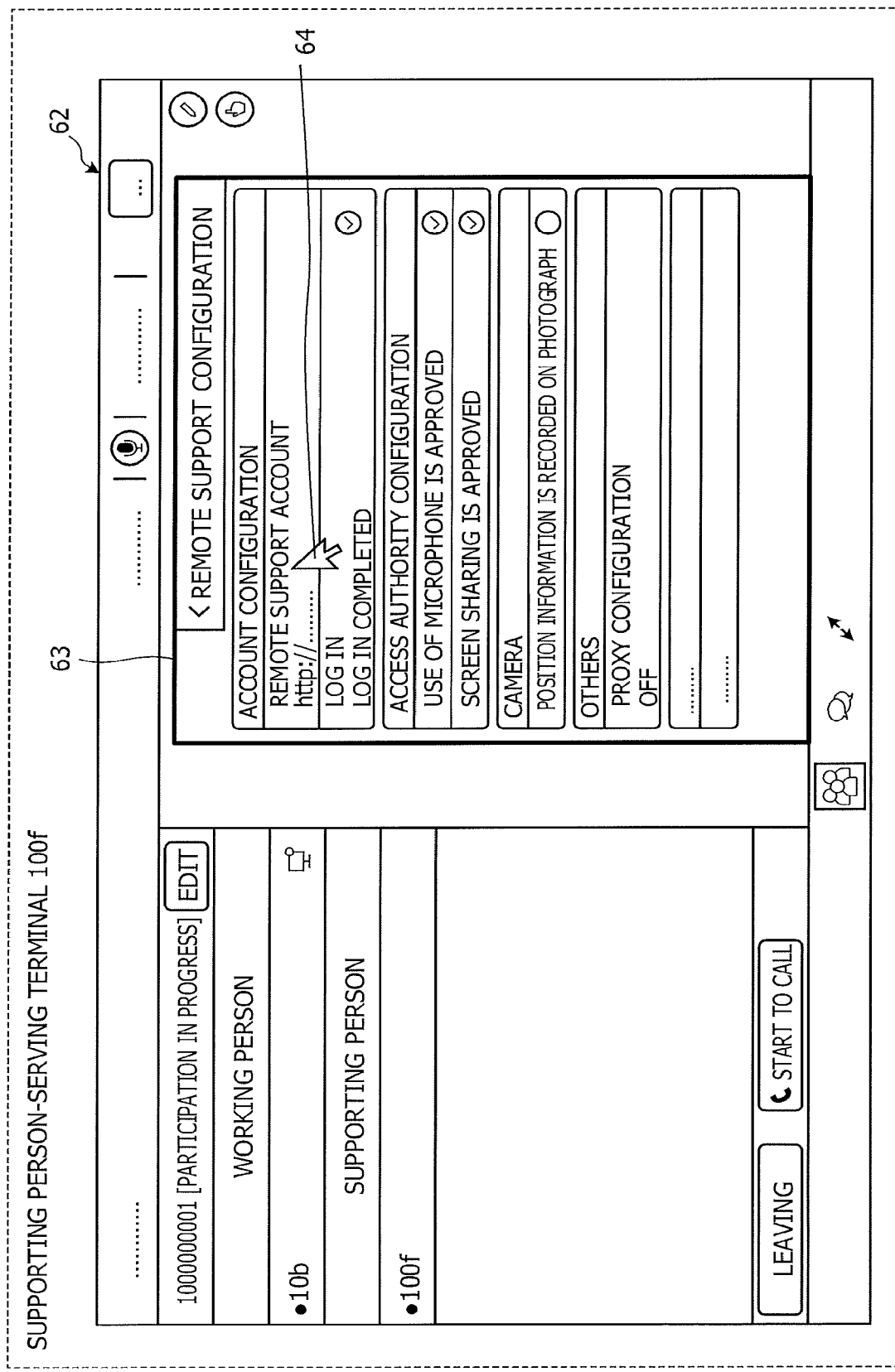
FIGS. 9A, 9B, 9C, and 9D are diagrams illustrating examples of an exclusive state, respectively.
Figure 9B:
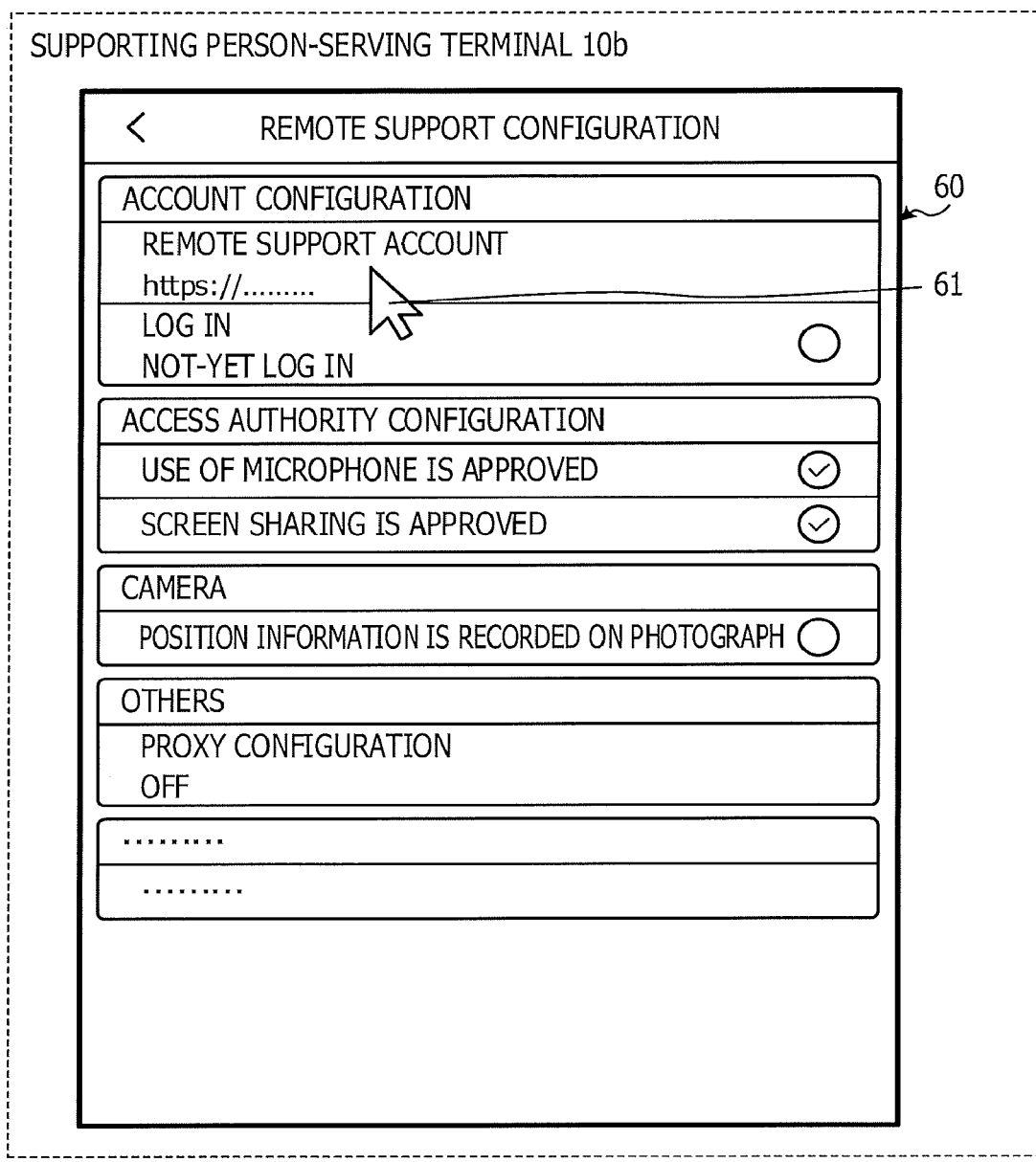
Figure 9C:
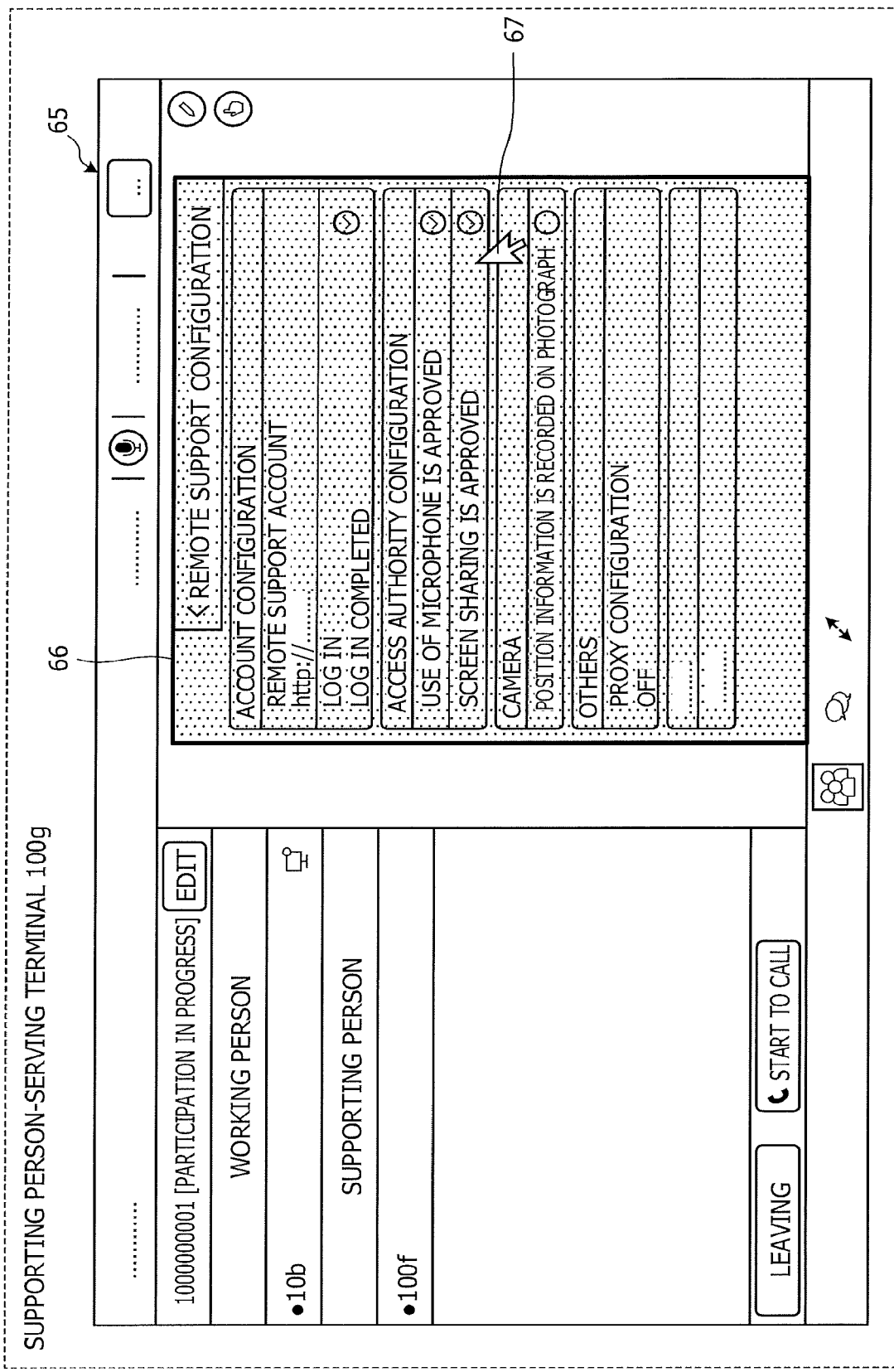
Figure 9D:
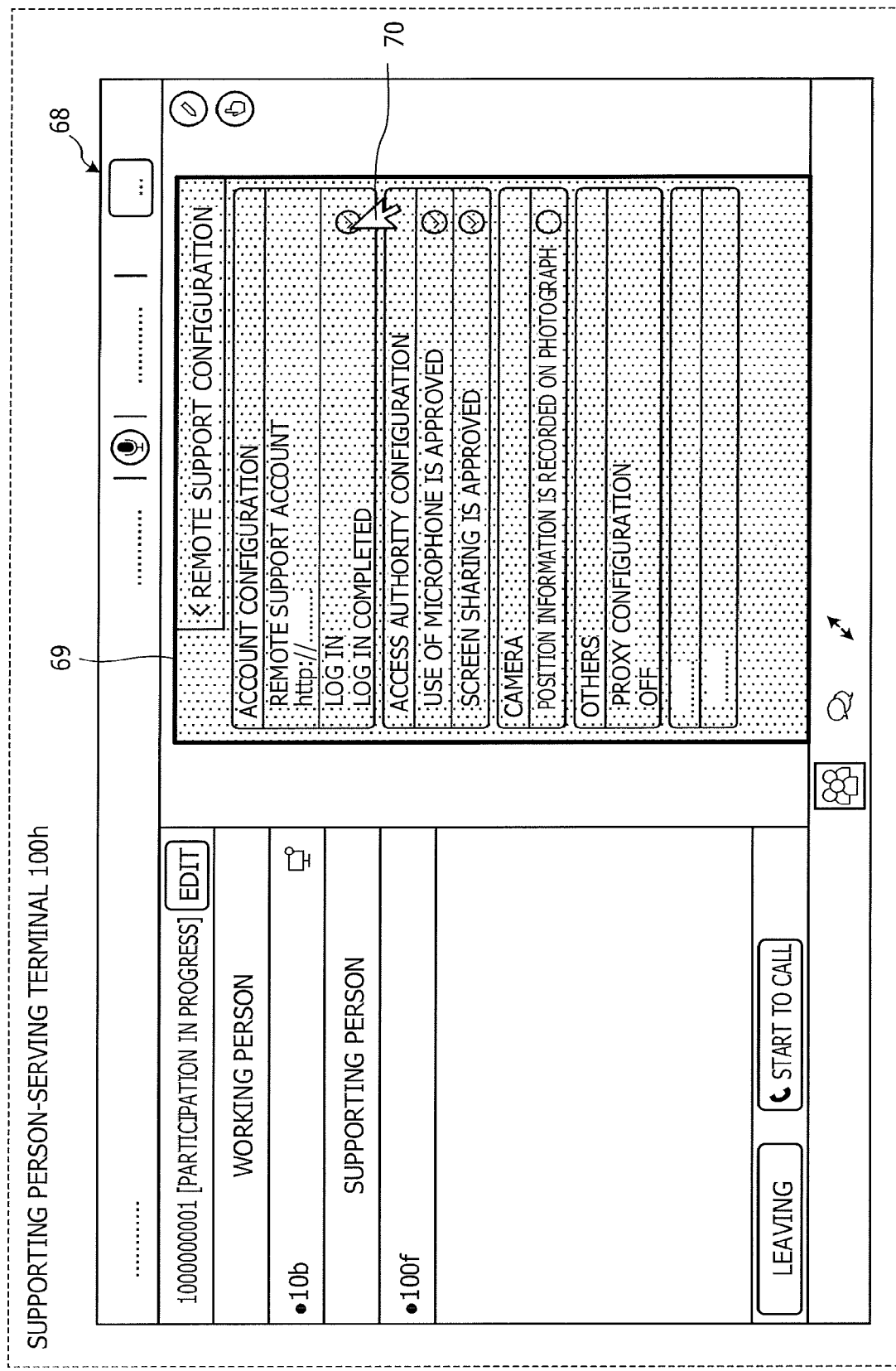

FIG. 7 is a diagram illustrating another example of the display screen on the supported-person side. A display screen 32 that is illustrated in FIG. 7 is an example of a display screen of an image that is captured with a camera of the supported person-serving terminal 10, which is displayed on the supported person-serving terminal 10. For example, the display screen 32, on which the captured image is displayed in real time, has an icon 33 for image-capturing a still image, an icon 34 for performing an enlarging or reducing operation, an icon 35 for temporarily stopping a real-time display, and an icon 36 for ending displaying of the image that is captured with the camera.

FIG. 8 is a diagram illustrating an example of the display screen on the supporting-person side in a state where the display screen on the supported-person side is shared. A display screen 40 that is illustrated in FIG. 8 is an example of the display screen in a state where a connection to a specific supported person-serving terminal 10 is made in a state of the display screen 20 in FIG. 4 and then a display screen 50 of a specific supported person-serving terminal 10 is shared. The display screen 40 has an operator box 41 indicating a supported person that is making a connection, a supporting-person box 42 indicating a supporting person that is making a connection, and an area 43 on which the display screen 50 of a specific supported person-serving terminal 10, which corresponds to the area 22 of the display screen 20, is displayed. Furthermore, the display screen 40 has a button 44 for starting to share a screen with the supported person-serving terminal 10 that is used by an operator who is displayed on the operator box 41, a button 45 for discontinuing a connection state, and a button 46 for starting a telephone conversation with an operator of a specific supported person-serving terminal 10 that is making a connection.

Furthermore, the display screen 40 has an icon 47 for writing a handwriting instruction to the display screen 50 that is displayed on the area 43, an icon 48 for performing the remote operation using a mouse cursor 52, and an icon 49 for muting a microphone of the supporting person-serving terminal 100. Furthermore, the display screen 40 has a frame 51 for explicitly indicating the display screen 50 that is displayed on the area 43. It is noted that in the following description, the inside of the frame 51 refers to a supported-person screen area. Furthermore, the frame 51 is able to be enlarged and reduced. As the frame 51 is enlarged and reduced, the display screen 50 is enlarged and reduced in the same manner. On the display screen 40, for example, there is a case where a display screen including various captured images on the display screen 32 that is illustrated in FIG. 7 is displayed on the area 43. In a case where a supporting person wants to write the handwriting is desired, the supporting person switches to a handwriting mode by clicking on the icon 47.

Furthermore, on the display screen 40, for example, in a case where various configuration screens that are displayed on the display screen 50, more precisely, operable screens are displayed on the area 43, if a supporting person wants to perform the remote operation, the supporting person switches to a remote operation mode by clicking on the icon 48. It is noted that the icon 47 and the icon 48 can be set to be a user interface that performs switching in a toggling manner. Furthermore, on the display screen 40, in the case where the remote operation mode is switched on, the supporting person operates the mouse cursor 52 of the supporting person-serving terminal 100, and thus operates operable screens of a specific supported person-serving terminal 10.

Returning to the description that is provided with reference to FIG. 2, when information of the display screen is input from the display control unit 132, the determination unit 133 determines whether or not the remote operation mode is switched on. In a case where the remote operation mode is not switched on, the determination unit 133 proceeds to a determination of whether or not the remote support system 1 is ended. In a case where the remote operation mode is switched on, the determination unit 133 determines whether or not the mouse cursor is present on the supported-person screen area. In a case where the mouse cursor is not present on the supported-person screen area, the determination unit 133 proceeds to the determination of whether or not the remote support system 1 is ended.

In a case where the mouse cursor is present on the supported-person screen area, the determination unit 133 refers to the operation authority storage unit 121 and thus determines whether or not the remote operation of a specific supported person-serving terminal 10 is being made to be exclusive by another supporting person-serving terminal 100. In a case where the remote operation is being made to be exclusive, it is difficult for the determination unit 133 to perform the remote operation that is exclusive to a specific supported person-serving terminal 10, and proceeds to the determination of whether or not end the remote support system 1. That is, the determination unit 133 makes a first determination of whether or not a position of the mouse cursor of the supporting person-serving terminal 100 is included within the range of the displayed screen. Furthermore, the determination unit 133 makes a second determination of whether or not the information indicating that another supporting person-serving terminal 100 that has the authority to operate a specific supported person-serving terminal 10 is present is stored in the operation authority storage unit 121. In a case where none of the first determination and the second determination by the determination unit 133 is positive, the supporting person-serving terminal 100 makes another supporting person-serving terminal 100 rejected, and performs the remote operation of the supported person-serving terminal 10.

In a case where the remote operation is not being made to be exclusive, the determination unit 133 determines whether or not an operation of starting the exclusive control of the remote operation is applied. It is noted that the operation of starting the exclusive control of the remote operation, for example, can be set to be a mouse operation that is defined in advance, for example, such as when right and left buttons of the mouse are pushed down on at the same time. Furthermore, when it comes to the operation of starting the exclusive control of the remote operation, the presence of the mouse cursor on the supported-person screen area may be regarded as applying the operation of starting the exclusive control of the remote operation. In a case where the operation of starting the exclusive control of the remote operation is not applied, the determination unit 133 proceeds to the determination of whether or not the remote support system 1 is ended.

In a case where the operation of starting the exclusive control of the remote operation is applied, the determination unit 133 generates the exclusive control starting information and outputs the generated exclusive control starting information to the transmission control unit 134. When the exclusive control starting information is output to the transmission control unit 134, the determination unit 133 outputs the operation information that includes a coordinate value of the mouse cursor on the supported-person screen area and a mouse event, to the transmission control unit 134.

Furthermore, the determination unit 133 determines whether or not the remote support system 1 is ended. In a case where the remote support system 1 is not ended, the determination unit 133 performs remote support continuously between the supported person-serving terminal 10 and the supporting person-serving terminal 100. In a case where the remote support system 1 is ended, the determination unit 133 notifies the supported person-serving terminal 10 and the server 200 that the remote support system 1 is not ended, and ends operation control processing in the supporting person-serving terminal 100.

Furthermore, in a case where the remote operation is being made to be exclusive by another supporting person-serving terminal 100, the determination unit 133 may end the exclusive control of the remote operation that is performed by the another supporting person-serving terminal 100, in a compulsory manner, and the exclusive control starting information of the supporting person-serving terminal 100 to which the determination unit 133 itself belongs may be made to be transmitted to the server 200. That is, in a case where the information indicating that another supporting person-serving terminal 100 that has the authority to operate a specific supported person-serving terminal 10 is present is stored in the operation authority storage unit 121, when a specific operation is input, the determination unit 133 acquires the exclusive right in a compulsory manner. Furthermore, the determination unit 133 makes the same determination as in a case where the information indicating that another supporting person-serving terminal 100 that has the authority to operate a specific supported person-serving terminal 10 is present is not stored in the operation authority storage unit 121. It is noted that as examples of a specific operation, clicking on of an emergency icon, a mouse operation that is defined as one for emergency, and the like are given.

When the exclusive control starting information is input from the determination unit 133, the transmission control unit 134 transmits the exclusive control starting information that is input, to the server 200 through the communication unit 110 and the network N. Furthermore, when the operation information is input from the determination unit 133, the transmission control unit 134 transmits the operation information that is input, through the communication unit 110, the network N and the server 200, with a specific supported person-serving terminal 10 as a destination thereof.

That is, in a case where any determination of the first determination and the second determination by the determination unit 133 is positive, the transmission control unit 134 transmits the operation information that includes the position of the mouse cursor and details of the operation by the mouse cursor, with a specific supported person-serving terminal 10 as a destination thereof.

When transmitting the operation information to a specific supported person-serving terminal 10, the transmission control unit 134 determines whether or not the operation of ending the exclusive control of the remote operation is applied. In a case where the operation of ending the exclusive control of the remote operation is not applied, the transmission control unit 134 continuously transmits the operation information, with a specific supported person-serving terminal 10 as a destination thereof.

In a case where the operation of ending the exclusive control of the remote operation is applied, the transmission control unit 134 generates the exclusive control ending information and transmits the generated exclusive control ending information to the server 200 through the communication unit 110 and the network N. It is noted that the exclusive control ending information is denial information for denying the authority to operate a specific supported person-serving terminal 10.

Furthermore, as an example of the operation of ending the exclusive control of the remote operation, a case is given where with the operating of the mouse, the position of the mouse cursor is not included within a range of a screen, more precisely, within the supported-person screen area. Furthermore, as an example of the operation of ending the exclusive control of the remote operation, a case is given where the icon that, along with the supported-person screen area, is displayed on the display unit 111 is touched.

Furthermore, when it comes to the operation of ending the exclusive control of the remote operation, in addition, for example, in a case where a predetermined time elapses after the operation information is transmitted, this may be regarded as the operation of ending the exclusive control of the remote operation being applied. It is noted that the predetermined time, for example, can be set to 30 seconds or one minute. Furthermore, when it comes to the operation of ending the exclusive control of the remote operation, in a case where the display screen of the supporting person-serving terminal 100 transitions from a display screen that includes the supported-person screen area to another display screen, this may be regarded as the operation of ending the exclusive control of the remote operation being applied. As an example of the other display screen, the configuration screen or the like is given. Furthermore, as the operation of ending the exclusive control of the remote operation, a case is given where a mouse generation that is defined in advance is input or the display screen of the supporting person-serving terminal 100 is minimized. It is noted that as an example of the mouse operation that is defined in advance, left-clicking or multi-clicking, or the like is given.

At this point, an exclusive state of the remote operation in the supporting person-serving terminal 100 and another supporting person-serving terminal 100 is described with reference to FIG. 9. FIG. 9 is a diagram illustrating an example of the exclusive state. As illustrated in FIG. 9, a supported person-serving terminal 10b and each of the supporting person-serving terminals 100f to 100h are making connections to each other. Furthermore, FIG. 9 illustrates a state where the supporting person-serving terminal 100f starts the remote operating of the supported person-serving terminal 10b. At this time, a mouse cursor 61 that corresponds to a mouse cursor 64 of the supporting person-serving terminal 100f is displayed on a display screen 60 of the supported person-serving terminal 10b. The display screen 60 of the supported person-serving terminal 10b is displayed on a supported-person screen area 63 of a display screen 62 of the supporting person-serving terminal 100f, and a mouse cursor 64 is positioned within the supported-person screen area 63. That is, the supporting person-serving terminal 100f performs the remote operating of the display screen 60 of the supported person-serving terminal 10b.

In contrast, the display screen 60 of the supported person-serving terminal 10b is displayed on a supported-person screen area 66 of a display screen 65 of the supporting person-serving terminal 100g that is another supporting person-serving terminal 100. Furthermore, for example, hatching is further displayed, in a superimposed manner, on the supported-person screen area 66, in order to provide a notice saying that the remote operation mode is in the exclusive state. In this case, although a mouse cursor 67 of the supporting person-serving terminal 100g is positioned within the supported-person screen area 66, the display screen 60 of the supported person-serving terminal 10b is difficult to operate remotely. That is, a mouse cursor that corresponds to a mouse cursor 67 of the supporting person-serving terminal 100g is not displayed on the display screen 60 of the supported person-serving terminal 10b.

In the same manner, the display screen 60 of the supported person-serving terminal 10b is displayed on a supported-person screen area 69 of a display screen 68 of the supporting person-serving terminal 100h that is another supporting person-serving terminal 100. Furthermore, for example, hatching is further displayed, in a superimposed manner, on the supported-person screen area 69, in order to provide a notice saying that the remote operation mode is in the exclusive state. In this case, although a mouse cursor 70 of the supporting person-serving terminal 100h is positioned within the supported-person screen area 69, the display screen 60 of the supported person-serving terminal 10b is difficult to operate remotely. That is, a mouse cursor that corresponds to a mouse cursor 70 of the supporting person-serving terminal 100h is not displayed on the display screen 60 of the supported person-serving terminal 10b. In this manner, in the remote support system 1, in a case where one supporting person-serving terminal 100 remotely operates a specific supported person-serving terminal 10, the remote operation from another supporting person-serving terminal 100 is rejected.

Subsequently, a configuration of the server 200 is described. As is illustrated in FIG. 2, the server 200 has a communication unit 210, a storage unit 220, and a control unit 230. It is noted that in addition to the functional units that are illustrated in FIG. 2, the server 200 may have various functional units that are retained by a well-known computer, for example, functional units such as various input devices or audio output devices.

The communication unit 210, for example, is realized as a NIC or the like. The communication unit 210 is a communication interface that is connected to the supported person-serving terminal 10 and the supporting person-serving terminal 100 in a wired or wireless manner through the network N, and manages communication of information between the supported person-serving terminal 10 and the supporting person-serving terminal 100. When a connection request is received from the supported person-serving terminal 10 or the supporting person-serving terminal 100, which is a connection request source, the communication unit 210 outputs the received connection request to the control unit 230. When receiving the operation information that is transmitted from the supporting person-serving terminal 100 with a specific supported person-serving terminal 10 as a destination thereof, the communication unit 210 outputs the received operation information to the control unit 230.

When receiving the exclusive control starting information or the exclusive control ending information from the supporting person-serving terminal 100, the communication unit 210 outputs the received exclusive control starting information or exclusive control ending information to the control unit 230. Furthermore, when the starting event or ending event that is the exclusive control is input from the control unit 230, the communication unit 210 transmits that the starting event or ending event that is the exclusive control, which is input, to the supporting person-serving terminal 100.

The storage unit 220, for example, is realized as a semiconductor memory element, such as a RAM or a Flash Memory, or by a storage device, such as a hard disk or an optical disk. The storage unit 220 has an operation authority storage unit 221. Furthermore, information that is used for processing in the control unit 230 is stored in the storage unit 220. It is noted that because an operation authority storage unit 221 is the same as the operation authority storage unit 121 of the supporting person-serving terminal 100, a description thereof is omitted.

For example, a CPU, a MPU, or the like causes a program, which is stored within the storage device, to be executed to cause the RAM to operate as a working area, and thus the control unit 230 is realized. Furthermore, the control unit 230, for example, may be realized as an integrated circuit such as an ASIC or a FPGA. The control unit 230 has a relay unit 231 and a notification unit 232, and realizes or performs a function or an operation for information processing that will be described below. It is noted that an internal configuration of the control unit 230 is not limited to the configuration that is illustrated in FIG. 2, and any configuration that performs the information processing that will be described below may be possible.

The relay unit 231 receives the connection request from the supported person-serving terminal 10 or the supporting person-serving terminal 100, which is a connection request source, through the network N and the communication unit 210. Based on the received connection request, the relay unit 231 relays communication between the supported person-serving terminal 10 or the supporting person-serving terminal 100, which is a connection request source, and the supporting person-serving terminal 100 or the supported person-serving terminal 10, which is a connection request destination.

The notification unit 232 determines whether or not the exclusive control starting information is received from the supporting person-serving terminal 100 through the network N and the communication unit 210. In a case where the exclusive control starting information is not received, the notification unit 232 proceeds to a determination of whether or not the exclusive control ending information is received. In a case where the exclusive control starting information is received, the notification unit 232 determines whether or not the notification of the starting event that is the exclusive control to a specific supported person-serving terminal 10 is completed. Furthermore, based on the received exclusive control starting information, the notification unit 232 stores the authority to operate a corresponding specific supported person-serving terminal 10, in the operation authority storage unit 221.

In a case where the notification of the starting event that is the exclusive control is completed, the notification unit 232 proceeds to a determination of whether or not the exclusive control ending information is received. In a case where the notification of the starting event that is the exclusive control is not completed, the notification unit 232 transmits the starting event that is the exclusive control, to a supporting person-serving terminal 100 other than the supporting person-serving terminal 100 that transmits the exclusive control starting information, in order to notify the exclusive starting.

The notification unit 232 determines whether or not the exclusive control ending information is received from the supporting person-serving terminal 100 through the network N and the communication unit 210. In a case where the exclusive control ending information is not received, the notification unit 232 determines whether or not the remote support system 1 is ended. In a case where the exclusive control ending information is received, the notification unit 232 transmits the ending event that is the exclusive control, to a supporting person-serving terminal 100 other than the supporting person-serving terminal 100 that transmits the exclusive control ending information, in order to notify the exclusive ending.

Furthermore, the notification unit 232 determines whether or not the remote support system 1 is ended. In a case where the remote support system 1 is not ended, the notification unit 232 continuously performs relay or notification processing for communication between the supported person-serving terminal 10 and the supporting person-serving terminal 100. In a case where the remote support system 1 is ended, the notification unit 232 notifies the supported person-serving terminal 10 and the supporting person-serving terminal 100 that the remote support system 1 is ended, and ends the relay or notification processing in the server 200.

Figure 10:
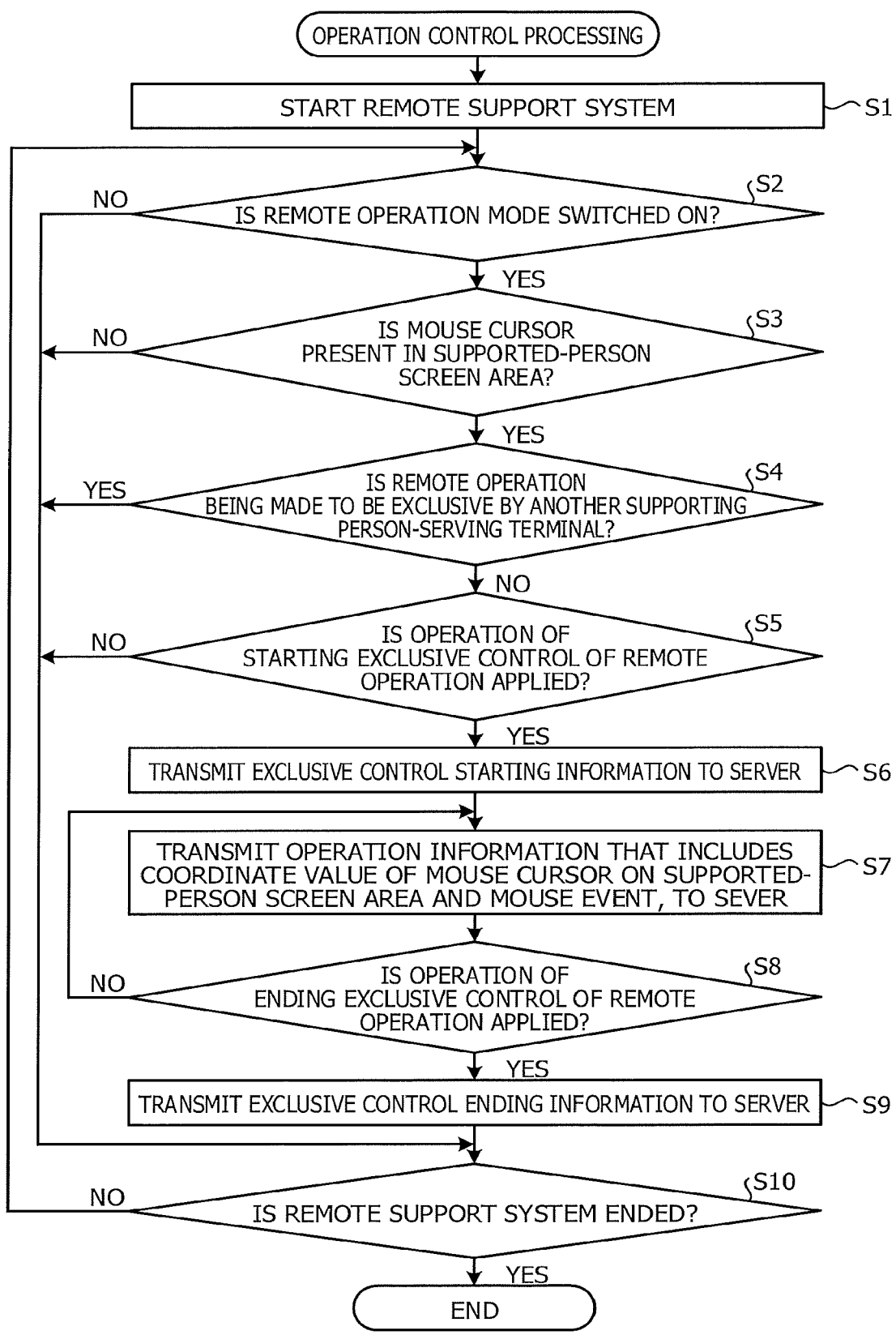
FIG. 10 is a flowchart illustrating an example of operation control processing according to the embodiment.

Next, operation of the remote support system 1 according to the embodiment is described. First, the operation control processing in the supporting person-serving terminal 100 is described. FIG. 10 is a flowchart illustrating an example of the operation control processing according to the embodiment.

The server 200 is activated by a manager of the remote support system 1, and the supporting person-serving terminal 100 starts to operate the remote support system 1 along with the supported person-serving terminal 10 (Step S1).

When a connection is established between a specific supported person-serving terminal 10 that is a support destination and the supporting person-serving terminal 100, the acquisition unit 131 of the supporting person-serving terminal 100 acquires the image information of the display screen of the specific supported person-serving terminal 10. The acquisition unit 131 outputs the acquired image information to the display control unit 132. Based on the image information that is input, the display control unit 132 generates a display screen for sharing a display screen of a specific supported person-serving terminal 10, and causes the generated display screen to be output to the display unit 111 for displaying. Furthermore, the display control unit 132 outputs information of the generated display screen to the determination unit 133.

When the information of the display screen is input from the display control unit 132, the determination unit 133 determines whether or not the remote operation mode is switched on (Step S2). In a case where the remote operation mode is not switched on (Negative in Step S2), the determination unit 133 proceeds to Step S10. In the case where the remote operation mode is switched on (positive in Step S2), the determination unit 133 determines whether or not the mouse cursor is present on the supported-person screen area (Step S3). In a case where the mouse cursor is not present on the supported-person screen area (negative in Step S3), the determination unit 133 proceeds to Step S10.

In the case where the mouse cursor is present on the supported-person screen area (positive in Step S3), the determination unit 133 refers to the operation authority storage unit 121 and thus determines whether or not the remote operation of a specific supported person-serving terminal 10 is being made to be exclusive by another supporting person-serving terminal 100 (Step S4). In the case where the remote operation is being made to be exclusive (positive in Step S4), the determination unit 133 proceeds to Step S10.

In the case where the remote operation is not being made to be exclusive (negative in Step S4), the determination unit 133 determines whether or not an operation of starting the exclusive control of the remote operation by the supporting person is applied by the supporting person (Step S5). In a case where the operation of starting the exclusive control of the remote operation is not applied (negative in Step S5), the determination unit 133 proceeds to Step S10.

In the case where the operation of starting the exclusive control of the remote operation is applied (positive in Step S5), the determination unit 133 generates the exclusive control starting information and outputs the generated exclusive control starting information to the transmission control unit 134. When the exclusive control starting information is input from the determination unit 133, the transmission control unit 134 transmits the exclusive control starting information that is input, to the server 200 (Step S6).

When the exclusive control starting information is output to the transmission control unit 134, the determination unit 133 outputs the operation information that includes the coordinate value of the mouse cursor on the supported-person screen area and the mouse event, to the transmission control unit 134. When the operation information is input from the determination unit 133, the transmission control unit 134 transmits the operation information that is input, to the server 200 (Step S7). That is, the transmission control unit 134 transmits the operation information through the server 200 with a specific supported person-serving terminal 10 as a destination thereof.

When transmitting the operation information to a specific supported person-serving terminal 10, the transmission control unit 134 determines whether or not the operation of ending the exclusive control of the remote operation is applied (Step S8). In a case where the operation of ending the exclusive control of the remote operation is not received (negative in Step S8), the transmission control unit 134 returns to Step S7. In a case where the operation of ending the exclusive control of the remote operation is received (positive in Step S8), the transmission control unit 134 generates the exclusive control ending information. The transmission control unit 134 transmits the generated exclusive control ending information to the server 200 (Step S9) and proceeds to Step S10.

The determination unit 133 determines whether or not the remote support system 1 is ended (Step S10). In a case where the remote support system 1 is not ended (negative in Step S10), the determination unit 133 returns to Step S2. In the case where the remote support system 1 is ended (positive in Step S10), the determination unit 133 notifies the supported person-serving terminal 10 and the server 200 that the remote support system 1 is not ended, and ends the operation control processing in the supporting person-serving terminal 100. Accordingly, the supporting person-serving terminal 100 can reduce the operating burden on the supporting person during the remote operation.

Figure 11:
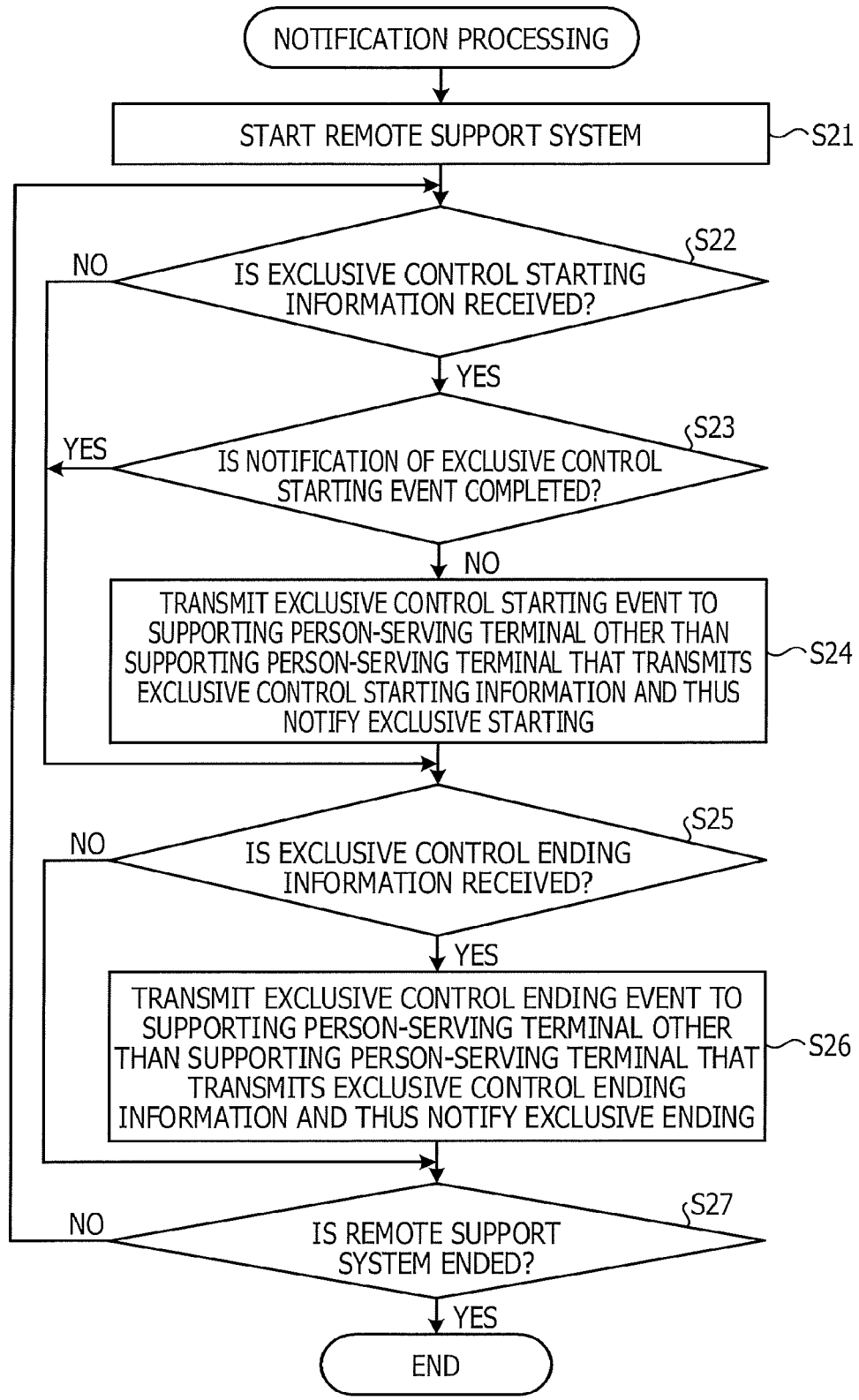
FIG. 11 is a flowchart illustrating an example of notification processing according to the embodiment.

Next, the notification processing in the server 200 is described. FIG. 11 is a flowchart illustrating an example of the notification processing according to the present embodiment.

The server 200 is activated by the manager of the remote support system 1, and the server 200 starts to operate the remote support system 1 along with the supported person-serving terminal 10 and the supporting person-serving terminal 100 (Step S21). The relay unit 231 of the server 200 receives the connection request from the supported person-serving terminal 10 or the supporting person-serving terminal 100, which is a connection request source. Based on the received connection request, the relay unit 231 relays the communication between the supported person-serving terminal 10 or the supporting person-serving terminal 100, which is a connection request source, and the supporting person-serving terminal 100 or the supported person-serving terminal 10, which is a connection request destination.

The notification unit 232 determines whether or not the exclusive control starting information is received from the supporting person-serving terminal 100 (Step S22). In a case where the exclusive control starting information is not received (negative in Step S22), the notification unit 232 proceeds to Step S25. In the case where the exclusive control starting information is received (positive in Step S22), the notification unit 232 determines whether or not the notification of the starting event that is the exclusive control to a specific supported person-serving terminal 10 is completed (Step S23).

In a case where the notification of the starting event that is the exclusive control is completed (positive in Step S23), the notification unit 232 proceeds to Step S25. In the case where the notification of the starting event that is the exclusive control is not completed (negative in Step S23), the notification unit 232 transmits the starting event that is the exclusive control, to a supporting person-serving terminal 100 other than the supporting person-serving terminal 100 that transmits the exclusive control starting information, in order to notify the exclusive starting (Step S24). When the exclusive starting is notified, the notification unit 232 proceeds to Step S25.

The notification unit 232 determines whether or not the exclusive control ending information is received from the supporting person-serving terminal 100 (Step S25). In a case where the exclusive control ending information is not received (negative in Step S25), the notification unit 232 proceeds to Step S27. In the case where the exclusive control ending information is received (positive in Step S25), the notification unit 232 transmits the ending event that is the exclusive control, to a supporting person-serving terminal 100 other than the supporting person-serving terminal 100 that transmits the exclusive control ending information, in order to notify the exclusive ending (Step S26). When the exclusive ending is notified, the notification unit 232 proceeds to Step S27.

The notification unit 232 determines whether or not the remote support system 1 is ended (Step S27). In a case where the remote support system 1 is not ended (negative in Step S27), the notification unit 232 proceeds to Step S22. In the case where the remote support system 1 is ended (positive in Step S27), the notification unit 232 notifies the supported person-serving terminal 10 and the supporting person-serving terminal 100 that the remote support system 1 is ended, and ends the relay or notification processing in the server 200. Accordingly, the server 200 can perform the exclusive control of the supporting person-serving terminal 100 that performs the remote operating of the supported person-serving terminal 10.

It is noted that in the embodiment described above, the server 200 performs the notification processing, but no limitation to this is imposed. For example, the server 200 may establish a connection for the communication between the supported person-serving terminal 10 and the supporting person-serving terminal 100, and the notification processing relating to the exclusive control may be performed in the supported person-serving terminal 10.

In this manner, the supporting person-serving terminal 100 acquires image information of a display screen of a specific supported person-serving terminal 10 that performs processing in accordance with operation information that is received. Furthermore, based on the acquired image information, the supporting person-serving terminal 100 displays a screen in accordance with the display screen on the display unit 111. Furthermore, the supporting person-serving terminal 100 makes a determination of whether or not the position of the cursor of the supporting person-serving terminal 100 is included within the range of the displayed screen. Furthermore, the supporting person-serving terminal 100 makes a determination of whether or not the information indicating that another supporting person-serving terminal 100 that has the authority to operate a specific supported person-serving terminal 10 is present is stored in the operation authority storage unit 121. Furthermore, in the case where any determination is positive, the supporting person-serving terminal 100 transmits the operation information that includes the position of the cursor and the details of the operation by the cursor, with a specific supported person-serving terminal 10 as a destination thereof. As a result, the operating burden on the supporting person during the remote operation can be reduced.

Furthermore, in a case where the position of the cursor is not included within the range of the screen, the supporting person-serving terminal 100 further transmits the denial information for denying the authority to operate a specific supported person-serving terminal 10, with the server 20 as a destination thereof. As a result, the operating burden on the supporting person during the remote operation can be reduced.

Furthermore, in the case where the icon that, along with the screen, is displayed on the display unit 111 is touched, the supporting person-serving terminal 100 further transmits the denial information that denies the authority to operate a specific supported person-serving terminal 10, with the server 20 as a destination thereof. As a result, the supporting person can perform the denial of the operation authority.

Furthermore, in a case where a predetermined time elapses after the operation information is transmitted, the supporting person-serving terminal 100 further transmits the denial information for denying the authority to operate a specific supported person-serving terminal 10, with the server 20 as a destination thereof. As a result, although the supporting person-serving terminal 100 is left neglected in a state of having the operation authority, another supporting person-serving terminal 100 can obtain the operation authority.

Furthermore, in a case where the display screen of the supporting person-serving terminal 100 transitions from the display screen that includes the screen of the supported person-serving terminal 10 to another display screen, the supporting person-serving terminal 100 further transmits the denial information for denying the authority to operate a specific supported person-serving terminal 10, with the server 20 as a destination thereof. As a result, only with the switching of the display screen the supporting person-serving terminal 100 by the supporting person, another supporting person-serving terminal 100 can obtain the operation authority.

Furthermore, in a case where the mouse operation that is defined in advance is input, or the display screen of the supporting person-serving terminal 100 is minimized, the supporting person-serving terminal 100 further transmits the denial information for denying the authority to operate a specific supported person-serving terminal 10, with the server 20 as a destination thereof. As a result, another supporting person-serving terminal 100 can obtain the operation authority, according to the in-advance-defined mouse operation by the supporting person, or the operation of minimizing the display screen.

Furthermore, in the case where the information indicating that another supporting person-serving terminal 100 that has the authority to operate a specific supported person-serving terminal 10 is present is stored in the operation authority storage unit 121, when a specific operation is input, the supporting person-serving terminal 100 acquires the exclusive right in a compulsory manner. Furthermore, the supporting person-serving terminal 100 makes the same determination as in a case where the information indicating that another supporting person-serving terminal 100 that has the authority to operate a specific supported person-serving terminal 10 is present is not stored in the operation authority storage unit 121. As a result, in a case where the remote operation that has a high level of emergency is desirable, the remote operation that is performed by another supporting person-serving terminal 100 is interrupted, and thus the remote operation that has a high level of emergency can be performed.

It is noted that in the embodiment described above, the screen of the supported person-serving terminal 10, which is displayed on the supporting person-serving terminal 100, and the area in which the mouse cursor rejecting the remote operation that is performed by another supporting person-serving terminal 100 is positioned are set to be the same, but no limitation to this is imposed. For example, the area that rejects the remote operation may be larger than that of the screen of the supported person-serving terminal 10, and may be made to be limited to the screen relating to the operation.

Furthermore, in the embodiment described above, in a case where the supporting person-serving terminal 100 is in the remote operation mode, the remote operation that is performed by another supporting person-serving terminal 100 is rejected. However, in a case where the supporting person-serving terminal 100 is in the handwriting mode, because the camera is used in many cases, the remote operation that is performed by another supporting person-serving terminal 100 may be rejected and may not be rejected.

Furthermore, constituent elements, such as the units that are illustrated, do not necessarily have to be configured physically as illustrated. That is, a specific aspect of distribution or integration of the units is not limited to the one that is illustrated, and one or several of or all of the units can be configured to be distributed or integrated functionally or physically on an arbitrary per-unit basis according to various loads or operating conditions. For example, the determination unit 133 and the transmission control unit 134 may be integrated into one piece. Furthermore, types of processing that are illustrated are limited to the order described above, and may be performed at the same time and may be order-changed in a range where these do not bring about contraction in terms of details of the processing.

Additionally, arbitrary one or several of, or all of the various functions for processing, which are performed in each device, may be made to be performed on a CPU (or a microcomputer such as an MPU or a micro controller unit (MCU)). Furthermore, it goes without saying that arbitrary one or several of, or all of the various functions for the processing may be made to be performed on a program that is interpretation-executed by CPU (or a microcomputer such as an MPU or a micro controller unit (MCU)), or on a hardware piece that uses wired logic.

Figure 12:
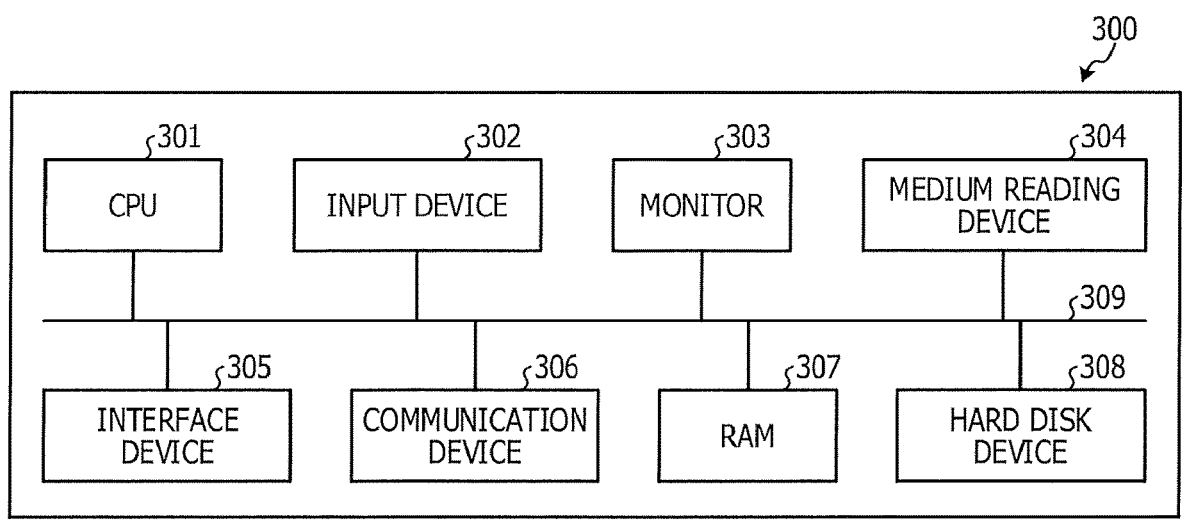
FIG. 12 is a diagram illustrating an example of a computer that executes an operation control program.

Incidentally, various types of processing that are described in the embodiment described above can be realized by a computer executing a program that is prepared in advance. Accordingly, an example of a computer that executes a program which has the same functions as in the embodiment described above will be described below. FIG. 12 is a diagram illustrating an example of a computer that executes an operation control program.

As illustrated in FIG. 12, a computer 300 has a CPU 301 that executes various types of arithmetic processing, an input device 302 that receives input of data, and a monitor 303. Furthermore, the computer 300 has a medium reading device 304 that reads a program or the like from a storage medium, an interface device 305 for making a connection to various devices, and a communication device 306 for making a connection to another information processing device or the like in a wired or wireless manner. Furthermore, the computer 300 has a RAM 307 in which various pieces of information are temporarily stored, and a hard disk device 308. Furthermore, the devices 301 to 308 are connected to a bus 309.

Stored in the hard disk device 308 is an operation control program that has the same functions as processing units, such as the acquisition unit 131, the display control unit 132, the determination unit 133, and the transmission control unit 134, which are illustrated in FIG. 2. Furthermore, stored in the hard disk device 308 are the operation authority storage unit 121 and various pieces of data for realizing the operation control program. The input device 302, for example, has the same function as the operation unit 112 that is illustrated in FIG. 2, and receives input of various pieces of information, such as the operation information, from a supporting person who is a user of the computer 300. For example, displayed on the monitor 303 are various screens, such as a display screen, for the supporting person that is the user of the computer 300. For example, a print device or the like is connected to the interface device 305. For example, the communication device 306, which is connected to the supported person-serving terminal 10 and the server 200, has the same function as the communication unit 110 that is illustrated in FIG. 2 and exchanges various pieces of information with the supported person-serving terminal 10 and the server 200.

The CPU 301 reads each program that is stored in the hard disk device 308, loads the read program onto the RAM 307 for execution, and thus performs various types of processing. Furthermore, these programs can cause the computer 300 to function as the acquisition unit 131, the display control unit 132, the determination unit 133, and the transmission control unit 134, which is illustrated in FIG. 2.

It is noted that the operation control program described above does not necessarily have to be stored in the hard disk device 308. For example, the program that is stored in a storage medium that is readable by the computer 300 may be read and executed by the computer 300. For example, a portable-type recoding medium, such as a CD-ROM, a DVD disk, or a universal serial bus (USB) memory, a semiconductor memory, such as a flash memory, a hard disk drive, or the like corresponds to the storage medium that is readable by the computer 300. Furthermore, the operation control program may be kept stored in a device that is connected to a public communication line, the Internet, a LAN, or the like, and the computer 300 may read the operation control program from these for execution.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A remote operation method executed by a computer, the remote operation method comprising:
    acquiring first display information that is displayed on a first display of a terminal;
    displaying second display information on a second display of the computer based on the first display information, the second display information including a first display area that includes the first display information and a second display area that includes display information of the computer;
    determining whether a first remote operation of the terminal is under execution by another computer, the other computer displaying a third display information on a third display of the other computer, the third display information including the first display information; and
    performing a second remote operation of the terminal when the computer determines that the first remote operation is not under execution by the other computer, wherein
    the computer performs the second remote operation according to input operations corresponding to a mouse cursor within the first display area, and
    the second remote operation is not performed according to input operations corresponding to the mouse cursor outside of the first display area.

2. The remote operation method according to claim 1, wherein the determining includes detecting a position of a cursor in an area on the second display, the area corresponding to the first display information.

3. The remote operation method according to claim 1, wherein the performing the second remote operation includes transmitting operation information to the terminal, the operation information including a position of a cursor on the second display and details of an operation by the cursor on the second display.

4. The remote operation method according to claim 1, further comprising, prior to the acquiring:
establishing a connection to a first terminal according to a request for remote support from the terminal.

5. The remote operation method according to claim 1, further comprising:
notifying the other computer of information indicating that the second remote operation is under execution by the computer.

6. The remote operation method according to claim 5, further comprising:
notifying the other computer of other information indicating the second remote operation terminates when a position of a cursor is not detected in an area on the second display, the area corresponding to the first display information.

7. The remote operation method according to claim 1, wherein the second remote operation is not performed when the second remote is determined to be under execution by the other computer.

8. The remote operation method according to claim 1, wherein
the computer and the other computer are operated by a plurality of supporting persons who perform remote support respectively, and
the terminal is operated by a supported person who is supported by the plurality of supporting persons.

9. The remote operation method according to claim 1, wherein the determining is performed by referring authority information indicating which computer of a plurality of computers is permitted to perform a remote operation of the terminal, the plurality of computers including the computer and the other computer.

10. The remote operation method according to claim 1, further comprising:
outputting denial information for waving permission of the computer to perform the second remote operation when an input with respect to a specific icon is detected, the specific icon being included in the second display information.

11. The remote operation method according to claim 1, further comprising:
outputting denial information for waiving permission of the computer to perform the second remote operation when a specific time has elapsed since a beginning of the first remote operation.

12. The remote operation method according to claim 1, further comprising:
outputting denial information for waiving permission of the computer to perform the second remote operation when the second display information transitions to other display information on the second display.

13. The remote operation method according to claim 1, further comprising:
outputting denial information for waiving permission of the computer to perform the second remote operation when the second display information is detected to be minimized on the second display.

14. The remote operation method according to claim 1, wherein after the determining indicates that the first remote operation is under execution by the other computer by the determining, the performing is executed when permission to perform a remote operation of the terminal is transferred from the other computer to the computer.

15. A remote operation device, comprising:
a memory; and
a processor coupled to the memory and the processor configured to:
acquire first display information that is displayed on a first display of a terminal;
display a second display information on a second display of the remote operation device based on the first display information, the second display information including a first display area that includes the first display information and a second display area that include display information of the remote operation device;
determine whether a first remote operation of the terminal is under execution by another computer, the other computer displaying a third display information on a third display of the other computer, the third display information including the first display information; and
perform a second remote operation of the terminal when the processor determines that the first remote operation of the terminal is not under execution by the other computer, wherein
the processor performs the second remote operation according to input operations corresponding to a mouse cursor within the first display area, and
the second remote operation is not performed according to input operations corresponding to the mouse cursor outside of the first display area.

16. A non-transitory computer-readable storage medium storing a program that causes a computer to execute a remote operation process comprising:
acquiring first display information that is displayed on a first display of a terminal;
displaying second display information on a second display of the computer based on the first display information, the second display information including a first display area that includes the first display information and a second display area that includes display information of the computer;
determining whether a first remote operation of the terminal is under execution by another computer, the other computer displaying a third display information on a third display of the other computer, the third display information including the first display information; and
performing a second remote operation of the terminal when the computer determines that the first remote operation of the terminal is not under execution by the other computer, wherein
the computer performs the second remote operation according to input operations corresponding to a mouse cursor within the first display area, and
the second remote operation is not performed according to input operations corresponding to the mouse cursor outside of the first display area.

* * * * *